US00RE48079E

(19) United States
(12) Reissued Patent
Broggi

(10) Patent Number: US RE48,079 E
(45) Date of Reissued Patent: Jul. 7, 2020

(54) PROCESS FOR PREPARING GRANULES OF PIGMENTS BY MEANS OF DOUBLE EXTRUSION

(71) Applicant: PPG Industries Ohio, Inc., Cleveland, OH (US)

(72) Inventor: Giovanni Broggi, Milan (IT)

(73) Assignee: PPG INDUSTRIES OHIO, INC., Cleveland, OH (US)

(21) Appl. No.: 15/234,512

(22) Filed: Aug. 11, 2016

Related U.S. Patent Documents

Reissue of:
(64) Patent No.: 8,802,752
Issued: Aug. 12, 2014
Appl. No.: 12/376,207
PCT Filed: Aug. 9, 2006
PCT No.: PCT/IT2006/000613
§ 371 (c)(1),
(2) Date: Feb. 3, 2009
PCT Pub. No.: WO2008/018097
PCT Pub. Date: Feb. 14, 2008

(51) Int. Cl.

| | |
|---|---|
| ***C08J 3/00*** | (2006.01) |
| ***C08L 31/00*** | (2006.01) |
| ***C09B 67/04*** | (2006.01) |
| ***B29C 48/76*** | (2019.01) |
| ***B29C 48/80*** | (2019.01) |
| ***B29C 48/625*** | (2019.01) |
| ***B29C 48/05*** | (2019.01) |
| ***C09B 67/42*** | (2006.01) |
| ***C09B 67/08*** | (2006.01) |
| *B29C 48/40* | (2019.01) |
| *B29K 61/00* | (2006.01) |
| *B29K 105/00* | (2006.01) |
| *B29K 105/16* | (2006.01) |

(52) U.S. Cl.
CPC ..... *C09B 67/0002* (2013.01); *B29C 48/05* (2019.02); *B29C 48/625* (2019.02); *B29C 48/761* (2019.02); *B29C 48/83* (2019.02); *B29C 48/832* (2019.02); *B29C 48/834* (2019.02); *C09B 67/0013* (2013.01); *C09B 67/0095* (2013.01); *B29C 48/40* (2019.02); *B29C 48/76* (2019.02); *B29K 2061/00* (2013.01); *B29K 2105/0032* (2013.01); *B29K 2105/16* (2013.01); *B29K 2105/251* (2013.01)

(58) Field of Classification Search
CPC ... B29C 47/366; B29C 47/78; B29C 47/0011; B29C 47/00; B29C 47/662; B29C 47/60; B29C 47/6087; B29C 47/50; B29C 47/0071; B29C 49/04; B30B 11/22; C08J 3/20; C08J 3/203; C08J 3/12; C08J 3/00; B29B 9/00; B29B 7/02
USPC ..... 523/353; 524/556, 592, 593, 599; 264/13
See application file for complete search history.

(56) References Cited

U.S. PATENT DOCUMENTS

| | | | | | |
|---|---|---|---|---|---|
| 4,176,143 | A * | 11/1979 | Kraft et al. | C08G 59/42 | 427/195 |
| 4,347,003 | A * | 8/1982 | Anders | B29C 47/50 | 366/193 |
| 5,158,725 | A | 10/1992 | Handa et al. | | |
| 5,711,904 | A * | 1/1998 | Eswaran et al. | 264/40.7 | |
| 6,160,037 | A * | 12/2000 | Leugs | C08F 2/44 | 106/31.13 |
| 6,551,087 | B1 * | 4/2003 | Martin | B29B 9/065 | 425/311 |
| 6,734,231 | B2 | 5/2004 | Creusen et al. | | |
| 2006/0020062 | A1 * | 1/2006 | Bloom | C07D 303/42 | 524/114 |
| 2008/0206568 | A1 * | 8/2008 | Bardelli et al. | 428/407 | |
| 2009/0182081 | A1 * | 7/2009 | Bardelli et al. | 524/408 | |
| 2010/0298472 | A1 * | 11/2010 | Bardelli | 524/88 | |

FOREIGN PATENT DOCUMENTS

| | | | |
|---|---|---|---|
| EP | 1277808 | A2 | 1/2003 |
| EP | 1277809 | * | 1/2003 |
| JP | 57015910 | A | 1/1982 |
| JP | 09239726 | A | 9/1997 |
| JP | 11090926 | A | 4/1999 |
| JP | 2000080172 | A | 3/2000 |
| JP | 2003-105224 | A | 4/2003 |
| JP | 2004018827 | A | 1/2004 |
| JP | 2004268505 | A | 9/2004 |
| WO | 2004/078852 | A | 9/2004 |

(Continued)

OTHER PUBLICATIONS

"PCT International Search Report dated Sep. 4, 2007 for PCT/IT2006/000613, from which the instant application is based," 4 pgs.

(Continued)

*Primary Examiner* — Norca L. Torres Velazquez
(74) *Attorney, Agent, or Firm* — Julie W. Meder

(57) ABSTRACT

A process for the production of a particle composition containing, at least one resin and at least one pigment is described, said process comprising the following steps: *extrusion of a mixture containing said at least one resin and said at least one pigment without induced heating; *subsequent extrusion, with induced heating, of the mixture obtained from the preceding extrusion; *granulation of the mixture thus obtained. With the abovementioned process it is possible to obtain a composition having granules with an average diameter less than 2 microns and a greater homogeneity than the known processes.

22 Claims, No Drawings

(56) References Cited

FOREIGN PATENT DOCUMENTS

| | | | |
|---|---|---|---|
| WO | 2006/082603 | A | 8/2006 |
| WO | WO2006/082603 | * | 8/2006 |

OTHER PUBLICATIONS

"PCT Written Opinion dated Sep. 4, 2007 for PCT/IT2006/000613, from which the instant application is based," 8 pgs.
"PCT Demand dated Dec. 5, 2007 for PCT/IT2006/000613, from which the instant application is based," 10 pgs.
"PCT International Preliminary Report on Patentability dated Nov. 26, 2008 for PCT/IT2006/000613, from which the instant application is based," 10 pgs.

* cited by examiner

PROCESS FOR PREPARING GRANULES OF PIGMENTS BY MEANS OF DOUBLE EXTRUSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a 35 U.S.C. 371 national stage filing from International Application No. PCT/IT2006/000613 filed Aug. 9, 2006, the teachings of which are incorporated herein by reference.

The present invention relates to a double-extrusion production process for coating organic and inorganic pigments preferably with acrylic, aldehyde and/or ketone resins in order to provide a particle composition preferably in the form of granules.

As is known, pigments are solids both of an organic and an inorganic nature which are defined as such when they are used within a fixing system, such as resins, absorbing a part of the light and reflecting their complementary part which forms the colour of the coated surface.

As such, they are solids with a very irregular surface, which differs from pigment to pigment, and having the property of interfacing with other substances completely different from each other and greatly influenced by the physical and chemical conditions of the contact elements.

Consequently, the formation of the colour, resulting from the mixture of various pigments, is not uniform among the various preparations, due not only to the change in environmental conditions, which vary in each case, but also the differences in properties of the surface of the pigment and the surface tension properties of the polymers during melting which, even though not different from batch to batch, may vary slightly.

The difficulties of integrating pigments in vehicle systems based on widely varying resins are well known.

This is true both in the case of powder systems, where contact of the pigment occurs with a polymer resin in the melted state inside an extruder, and in the case of liquid systems where interfacing occurs with polymers (resins) in the form of a solution, emulsion or dispersion diluted both with solvents and/or water, which have a flocculating effect on the system.

At present in the formulations of powder paints, insertion of the pigments is performed by means of simple physical mixing of the said pigments with granules of varying form (chips or flakes) of the resins, which form the vehicle with the addition of chemical additives able to improve the contact between pigment and resin so as to integrate the pigment in the resin, during extrusion where melting of the resin contained in the mix and dispersion or milling of the pigment(s) in a liquid/viscous phase occurs.

This process normally uses single-screw extruders (single-screw Bandera type) which have a pigment milling capacity which is not sufficiently powerful and therefore not exactly suitable for extruding organic pigments with a high calorimetric yield and for this reason are mainly used for inorganic or organic pigments, but in products where formation of the colour and the calorimetric yield are not to be regarded as decisive.

Twin-screw extruders with composite screws (Leistriz type) are normally used and known; these, compared to single-screw extruders, provide a better performance in terms of pigment refining and milling capacity and are therefore used whenever pigments which are difficult to mill are used and where a high calorimetric yield is required.

Both the single-screw and twin-screw extruders use heat supplied to the extrusion chamber in order to favour melting of the polymer and milling of the pigments in the liquid/viscous-phase.

Despite this, the use of twin-screw extruders has also proved to have limitations in terms of dispersion capacity in the case where particularly sophisticated and costly organic pigments are used, such as those developed for use in paints with a good resistance to external agents, transparency for use in metallic paints, high colour tone and high saturation, and where it is required to maximize the degree of dispersion and consequently the calorimetric yield; or also inorganic pigments which are particularly difficult to disperse or in both cases simply in order to be able to increase the concentration of the pigment in the extruded preparations, while maintaining good results in terms of dispersion.

In particular, with the methods known in the art, the fineness and the degree of homogeneity of milling which can be achieved with many organic pigments (such as, for example, magenta dimethylquinacridone Red 122 pigment, violet-red betaquinacridone Violet 19 pigment, orange diketo'pyrrolo-pyrrole Orange 73 pigment), are not acceptable for application sectors such as, for example, that of high-performance paints.

The pigment particles remain, in fact, too large (i.e. 5-30 microns for magenta dimethylquinacridone Red 122 pigment, 10-30 microns for violet-red betaquinacridone Violet 19 pigment, and 10-25 microns for orange diketo-pyrrolo-pyrrole Orange 73 pigment) as well as not being dispersed in a sufficiently homogeneous manner, negatively affecting properties such as the colorimetric yield, the brilliance and the tone.

In all these cases, a second extrusion in a hot extruder has not provided a substantial improvement in the degree of dispersion.

The possible use of extruded solid preparations not only in powder paints or as master batches in plastics, but also as solid substitute preparations, by means of solubilization with solvent, of the milling step, which is typical of liquid paints and inks, has accentuated the limitations and needs mentioned above.

DESCRIPTION OF THE INVENTION

It has therefore been necessary to develop a novel extrusion process for coating organic and/or inorganic pigments with resins, in order to obtain a formulation in the form of granules which allows the negative aspects of the present situation to be overcome.

This technology, which forms the subject of the present invention, is based on:

- a first extrusion of the resin and pigment based mixture without induced heating;
- a second extrusion with induced heating of the mixture from the first extrusion;
- granulation of the mixture thus obtained.

According to one aspect of the invention, the first extrusion is performed in a co-rotating twin-screw extruder which allows a first step to be performed without induced heating, using only the heat developed naturally by the cutting and friction forces inside the extruder.

The twin-screw extruder preferred for the invention uses screws with a diameter of 27-110 mm, preferably 30-87 mm, and length 25-48 times the diameter, preferably 32-40 times.

The temperature inside the abovementioned extruder may vary from about 0 to about 50° C., preferably from 5 to 35° C.; dividing ideally the inside of the extruder into 9 zones of identical length, the temperature is normally set in the first three zones to 5/15° C., preferably 10° C., in the second zones (3 to 6) to 15/25° C., preferably 20° C., and in the third zones (6 to 9) to 25/35° C., preferably 30° C.

The temperature inside the extruder is controlled both by the cooling set in the first zones of the extruder and by evaporation of the water present as a component of the mix; this is performed preferably by means of a breather valve situated towards the end part in the extruder conveying zone. Control of the temperature is important for keeping the mix in a not entirely melted state so that the cutting forces may exert their action more effectively.

The flowrate of the first extrusion is about 5-20 kg/h, preferably 10-15 kg/h.

The semifinished product, in a shapeless but homogeneous solid state of pigment and resin leaving the extruder after the first step, may contain water in large quantities, something which may make use thereof during subsequent extrusion difficult. In this case, it is preferable to add to the mixture surfactants or dispersants (which are preferably non-ionic, such as epoxidized sorbitan and soy bean oil esters, preferably epoxidized sorbitan ester), in order to favour wetting of the solid phase and provide a homogeneous mix with good extrudibility characteristics.

The extrudate from the first extrusion is then transferred for secondary extrusion; this procedure may be performed both in batches and continuously.

The second twin-screw extruder has screws with a diameter of 27-110 mm, preferably 30-87 mm, and length 30/60 times the diameter, preferably 48-60 times the diameter.

The temperature inside the abovementioned extruder may vary from about 50 to about 130° C., preferably from 80 to 110° C.; dividing ideally the inside of the extruder into 9 zones of identical length, the temperature is normally set, by means of the supply of induced heat, in the first three extrusion zones to 70/90° C., preferably 80° C., in the second zones (3 to 6) to 80/100° C., preferably 90° C., and in the third zones (6 to 9) to 90/110° C., preferably 100° C.

The flowrate of the first extrusion is 15-35 kg/h, preferably 20-30 kg/h.

The extrusion process is completed using a die and pelletizer.

The remaining water present in the mix is extracted also by means of application of a vacuum, if necessary, through the breather valve of the degassing system.

The fineness of milling and homogenization of the dispersed particles is completed obtaining a very narrow distribution of the particle size curve with particle size values which are small and less than values of 1-2 microns when measured using an optical microscope with ×200 magnification.

The melted state of the mass output from the second operation will also allow the production of microgranules by means of a die and water-cutting microgranulator mounted on the extruder head.

It should be emphasized that, while a single hot pass produces an irregular milling fineness with diffused presence of particles having a size of 5-30 microns, 10-30 microns, 10-25 microns in each case (when measured using an optical microscope with ×200 magnification), a dual cold/hot pass not only reduces the size of the particles to less than 1-2 microns, but also results in perfect uniformity thereof (narrow distribution of the particle size curve) and consequently a higher calorimetric yield.

In particular, in the case of formulations based on both inorganic and organic pigments, an aqueous solution of the dispersant is prepared (the water is preferably used in quantities ranging between 10 and 20% relative to the total weight of the formulation); the resin is introduced into the mixer (preferably an open receptacle of the high-speed blade type) and it is wetted with a quantity equal to about 50% of said solution; the pigment is introduced while mixing and the remaining amount of aqueous solution is added; the inert filler is added and, after mixing, the product is discharged and transferred to the extruder.

The mixture may also contain mineral reinforcing fillers, such as barium sulphate for example.

Mixing, both in the case of organic pigments and in the case of inorganic pigments, is normally performed at a speed of between 800 and 2200 rpm.

The granular formulation which can be obtained according to the process of the present invention may be used for the production of granular systems based on resin and pigment and known in the art, and in particular those described in the international patent applications PCT/IT2005/000443, PCT/IT2005/000536, PCT/EP2006/000019 and PCT/IT2006/000588, in the name of the same Applicants and incorporated herein by way of reference.

Description of the Plant/Process

The plant/process consists of:

a high-speed turbomixer with propeller impeller and number of revolutions ranging from 1000 to 3000 per minute, preferably 2000/2500 rpm, which allows homogenization of the components consisting of pigment(s), resin, additives and water.

A cooled co-rotating twin-screw extruder for the first pass (Leistriz type) suitable for obtaining a perfect cold dispersion of the pigments of the mixture from the turbomixer.

The "cold pass" does not supply heat and therefore avoids complete melting of the resin, but ensures, using only the "friction" heat produced by the high cutting forces which are generated, a perfect dispersion of the pigment, nevertheless obtaining a non-granular shapeless physical form.

A heated co-rotating twin-screw extruder (Leistriz type) in which the mixture melting process takes place, with complete outflow of the aqueous phase.

A microgranulator (Gala underwater pelletizing type) which is mounted on the extruder head is used for microgranulation of the extrudate in the aqueous phase.

Preferably the granules are produced by means of a water jet cutting granulator of the type produced by Gala Industries Inc. and described in international patent application WO/21371, incorporated herein by way of reference.

A sieving/drying system which consists essentially of a fluid-bed vibrating screen, for separation of the aqueous phase and sieving/screening of the granules from possible formations with a particle size not to specification and associated drying by hot-air means.

The microgranules obtained from the extrusion process which depending on the specific weight of the extruded mixture may have a number variable from 80 to 200 granules per gramme are supplemented with any silica fluidizing additive where required to avoid problems of compaction of the microgranules during storage or transportation in temperature conditions which are not properly controlled and conveyed away for packaging.

The examples which follow are intended to be purely illustrative and non-limiting and identify some of the possible mixtures of compounds to be supplied to the extruder in order to produce subsequently the particle compositions of the invention both in granule and in powder form; the water must not obviously be regarded as a component of the final formulation since it is eliminated during the drying stage; the parts are to be regarded by weight.

Example 1

| Conventional single-extrusion process | |
|---|---|
| Magenta dimethyquinacridone Red 122 pigment: | 25 |
| Barium sulphate: | 20 |
| Atmer ® 116 (ethoxylated sorbitol ester): | 5 |
| Laropal ® A 81 (aldehyde resin): | 50 |
| Water: | 12 |
| Extrusion parameters: | |
| Zones 1-3: | temp. 80° C. |
| Zone 4-6: | temp. 90° C. |
| Zones 7-9: | temp. 100° C. |
| Diameter of the screws: | 30 mm |
| Length of the screws: | 1560 mm |
| Die and pelletizer mounted | 15 kg/h |
| Yield: | |
| Result: milling fineness: | 5-30 microns |

Example 2

| Double-extrusion process | |
|---|---|
| Magenta dimethylquinacridone Red 122 pigment: | 25 |
| Barium sulphate: | 20 |
| Atmer ® 116 (ethoxylated sorbitol ester): | 5 |
| Laropal ® A 81 (aldehyde resin): | 55 |
| Water: | 12 |
| Parameters of first extrusion: | |
| Zones 1-3: | temp. 10° C. |
| Zones 4-6: | temp. 20° C. |
| Zones 7-9: | temp. 30° C. |
| Diameter of the screws: | 30 mm |
| Length of the screws: | 750 mm |
| Die and pelletizer not mounted | 25 kg/h |
| Yield: | |
| Parameters of second extrusion: | |
| Zones 1-3: | temp. 80° C. |
| Zones 4-6: | temp. 90° C. |
| Zones 7-9: | temp. 100° C. |
| Diameter of the screws: | 30 mm |
| Length of the screws: | 1560 mm |
| Die and pelletizer mounted | 15 kg/h |
| Yield: | |
| Result: milling fineness: | 1-2 microns |

Example 3

| Conventional single-extrusion process | |
|---|---|
| Violet-red betaquinacridone Violet 19 pigment: | 40 |
| Barium sulphate: | 10 |
| Atmer ® 116 (ethoxylated sorbitol ester): | 6 |
| Laropal ® A 81 (aldehyde resin): | 44 |
| Water: | 12 |

-continued

| Conventional single-extrusion process | |
|---|---|
| Extrusion parameters: | |
| Zones 1-3: | temp. 80° C. |
| Zones 4-6: | temp. 90° C. |
| Zones 7-9: | temp. 100° C. |
| Diameter of the screws: | 30 mm |
| Length of the screws: | 1560 mm |
| Die and pelletizer mounted | 15 kg/h |
| Yield: | |
| Result: milling fineness: | 10-30 microns |

Example 4

| Double-extrusion process | |
|---|---|
| Violet-red betaquinacridone Violet 19 pigment: | 40 |
| Barium sulphate: | 10 |
| Atmer ® 116 (ethoxylated sorbitol sorbitol): | 6 |
| Laropal ® A 81 (aldehyde resin): | 44 |
| Water: | 12 |
| Parameters of first extrusion: | |
| Zones 1-3: | temp. 10° C. |
| Zones 4-6: | temp. 20° C. |
| Zones 7-9: | temp. 30° C. |
| Diameter of the screws: | 30 mm |
| Length of the screws: | 750 mm |
| Die and pelletizer not mounted | 25 kg/h |
| Yield: | |
| Parameters of second extrusion: | |
| Zones 1-3: | temp. 80° C. |
| Zones 4-6: | temp. 90° C. |
| Zones 7-9: | temp. 100° C. |
| Diameter of the screws: | 30 mm |
| Length of the screws: | 1560 mm |
| Die and pelletizer mounted | 15 kg/h |
| Yield: | |
| Result: milling fineness: | 1-2 microns |

Example 5

| Conventional single-extrusion process | |
|---|---|
| Orange diketo-pyrrolo-pyrrole Orange 73 pigment: | 40 |
| Barium sulphate: | 10 |
| Atmer ® 116 (ethoxylated sorbitol ester): | 5 |
| Laropal ® A 81 (aldehyde resin): | 45 |
| Water: | 12 |
| Extrusion parameters: | |
| Zones 1-3: | temp. 80° C. |
| Zones 4-6: | temp. 90° C. |
| Zones 7-9: | temp. 100° C. |
| Diameter of the screws: | 30 mm |
| Length of the screws: | 1560 mm |
| Die and pelletizer mounted | 15 kg/h |
| Yield: | |
| Result: milling fineness: | 10-25 microns |

Example 6

| Double-extrusion process | |
|---|---|
| Orange diketo-pyrrolo-pyrrole Orange 73 pigment: | 40 |
| Barium sulphate: | 10 |
| Atmer ® 116 (ethoxylated sorbitol ester): | 5 |
| Laropal ® A 81 (aldehyde resin): | 45 |
| Water: | 12 |
| Parameters of first extrusion: | |
| Zones 1-3: | temp. 10° C. |
| Zones 4-6: | temp. 20° C. |
| Zones 7-9: | temp. 30° C. |
| Diameter of the screws: | 30 mm |
| Length of the screws: | 750 mm |
| Die and pelletizer not mounted | 25 kg/h |
| Yield: | |
| Parameters of second extrusion: | |
| Zones 1-3: | temp. 80° C. |
| Zones 4-6: | temp. 90° C. |
| Zones 7-9: | temp. 100° C. |
| Diameter of the screws: | 30 mm |
| Length of the screws: | 1560 mm |
| Die and pelletizer mounted | 15 kg/h |
| Yield: | |
| Result: milling fineness: | 1-2 microns |

The invention claimed is:

1. A process for the production of a particle composition containing at least one of aldehyde, ketone and acrylic resin, and at least one pigment, comprising the following steps:

(a) extrusion, in a co-rotating twin-screw extruder, of a mixture containing said at least resin and said at least one pigment without induced heating, using only the heat developed naturally by the cutting and friction forces inside the extruder, wherein the temperature inside the extruder according to step (a) varies from 5 to 50° Celsius, and the screws of the extruder according to step (a) have a length [20-40] *25-48* times the diameter*, and wherein an extrudate leaves the co-rotating twin-screw extruder after step (a) and comprises a non-granulated homogenous mixture of the at least one resin and the at least one pigment*;

(b) subsequent extrusion, with induced heating, of the mixture obtained from the extrusion according to step (a), wherein the temperature inside the extruder according to step (b) varies from 80 to 130° Celsius, and the screws of the extruder according to step (b) have a length 30-60 times the diameter; and (c) granulation of the mixture thus obtained*, wherein the extrusion of step (a) comprises a plurality of zones that are temperature controlled such that a temperature of at least one zone is set to a temperature within a range of from 10 to 15° C. and wherein the temperature of one or more zones of the first extrusion step is controlled with at least a cooling set, and*

*wherein the extrusion of step (b) comprises a plurality of zones that are temperature controlled such that a temperature of at least one zone increases from a temperature in a previous zone.*

2. The process according to claim 1, wherein step (b) is performed in a co-rotating twin-screw extruder.

3. The process according to claim 2, wherein the screws of the extruder according to step (a) have a diameter of 27-110 mm.

4. The process according to claim 3, wherein the screws of the extruder according to step (a) have a diameter of 30-87 mm.

5. The process according to claim 3, wherein said screws of the extruder according to step (a) have a length 25-40 times the diameter.

6. The process according to claim 5, wherein said screws of the extruder to step (a) have a length 32-40 times the diameter.

7. The process according to claim 1, wherein the temperature inside *one or more zones of* the extruder according to step (a) varies from 5 to 35° C.

8. The process according to claim 1, wherein the flowrate of the extrusion according to step (a) is 5-20 kg/h.

9. The process according to claim 1, wherein the flowrate of the extrusion according to step (a) is 10-15 kg/h.

10. The process according to claim 2, wherein the screws of the extruder according to step (b) have a diameter of 27-110 mm.

11. The process according to claim 10, wherein the screws of the extruder according to step (b) have a diameter of 30-87 mm.

12. The process according to claim 1, wherein said screws of the extruder to step (b) have a length 48-60 times the diameter.

13. The process according to claim 1, wherein the temperature inside the extruder according to step (b) varies from 80 to 110° C.

14. The process according to claim 1, wherein the flowrate of the extrusion according to step (b) is 15-35 kg/h.

15. The process according to claim 14, wherein the flowrate of the extrusion according to step (b) is 20-30 kg/h.

[16. The process according to claim 1, wherein the granulation is performed by means of cutting with a water jet.]

17. The process according to claim 1, wherein the granulation is performed by means of cutting with a water jet.

18. The process according to claim 1, wherein said at least one pigment is organic and/or inorganic.

19. The process according to claim 18, [wherein said] *further comprising a* mineral filler *and wherein the mineral filler* is a barium sulphate.

20. The process according to claim 1, wherein the mixture further contains at least one dispersant.

21. The process according to claim 20, wherein said dispersant is non-ionic.

22. The process according to claim 20, wherein said dispersant is selected from the group consisting of epoxidized sorbitan and soy bean oil esters.

23. The process according to claim 22, wherein said dispersant is the epoxidized sorbitan ester.

[24. The process according to claim 1, wherein said mixture further contains water.]

* * * * *